(12) United States Patent
Ishigaki et al.

(10) Patent No.: US 8,122,511 B2
(45) Date of Patent: Feb. 21, 2012

(54) ATTRIBUTE INFORMATION PROVIDING METHOD

(75) Inventors: Yoshinobu Ishigaki, Yokohama (JP); Masayuki Numao, Kawasaki (JP); Madoka Yuriyama, Fujisawa (JP); Yuji Watanabe, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 1320 days.

(21) Appl. No.: 10/568,513

(22) PCT Filed: Aug. 18, 2004

(86) PCT No.: PCT/JP2004/011831
§ 371 (c)(1),
(2), (4) Date: Feb. 15, 2006

(87) PCT Pub. No.: WO2005/022428
PCT Pub. Date: Mar. 10, 2005

(65) Prior Publication Data
US 2006/0200671 A1    Sep. 7, 2006

(30) Foreign Application Priority Data

Aug. 28, 2003 (JP) ................................ 2003-304882

(51) Int. Cl.
*G06F 7/04* (2006.01)
*G06F 17/30* (2006.01)
*H04L 9/32* (2006.01)
(52) U.S. Cl. .......... 726/26; 713/172; 713/173; 707/732; 705/65
(58) Field of Classification Search ............ 726/26
See application file for complete search history.

(56) References Cited

U.S. PATENT DOCUMENTS 4,926,479 A * 5/1990 Goldwasser et al. ......... 713/180
(Continued)

FOREIGN PATENT DOCUMENTS

JP    11-149504    6/1999
(Continued)

OTHER PUBLICATIONS

Chao, Alan I.; Krikeles, Basil C.; Lusignan, Angela E.; Starczewski, Edward. "An Exentsible, Ontology-based, Distributed Information System Architecture". Proceedings of the Sixth International Conference of Information Fusion. Pub. Date: 2003. Relevant pp. 642-649.*

*Primary Examiner* — Nathan Flynn
*Assistant Examiner* — Jeremiah Avery
(74) *Attorney, Agent, or Firm* — Schmeiser, Olsen & Watts; John Pivnichny

(57) ABSTRACT

A method for providing attribute data. A request is received from a user device for a virtual ID token relating to attribute information pertaining to a subscriber associated with the user device. Responsive to the request for the virtual ID token, a data record is read from a database. The data record includes L attributes of the subscriber. L is at least 2. The data record is provided to the user device. A selection of M attributes of the L attributes is received from the user device. M is less than L. A virtual record including the M attributes selected from the data record is generated. The virtual record includes a virtual ID (VID) for identifying the virtual record. The generated virtual record is stored in the database. The virtual ID token is provided to the user device. The virtual ID token includes the VID.

10 Claims, 5 Drawing Sheets

U.S. PATENT DOCUMENTS

| | | | | |
|---|---|---|---|---|
| 5,903,721 | A * | 5/1999 | Sixtus | 726/2 |
| 6,161,139 | A * | 12/2000 | Win et al. | 709/225 |
| 6,182,142 | B1 * | 1/2001 | Win et al. | 709/229 |
| 6,453,353 | B1 * | 9/2002 | Win et al. | 709/229 |
| 6,505,300 | B2 * | 1/2003 | Chan et al. | 713/164 |
| 6,542,927 | B2 * | 4/2003 | Rhoads | 709/217 |
| 6,615,258 | B1 * | 9/2003 | Barry et al. | 709/223 |
| 6,714,979 | B1 * | 3/2004 | Brandt et al. | 709/225 |
| 6,834,272 | B1 * | 12/2004 | Naor et al. | 705/80 |
| 6,915,271 | B1 * | 7/2005 | Meyer et al. | 705/14 |
| 7,290,056 | B1 * | 10/2007 | McLaughlin, Jr. | 709/230 |
| 7,587,368 | B2 * | 9/2009 | Felsher | 705/65 |
| 8,037,193 | B2 * | 10/2011 | Hay et al. | 709/229 |
| 2001/0055388 | A1 * | 12/2001 | Kaliski, Jr. | 380/30 |
| 2002/0087539 | A1 | 7/2002 | Muraoka | |
| 2002/0087553 | A1 | 7/2002 | Kitahara et al. | |
| 2002/0162006 | A1 | 10/2002 | Takahashi et al. | |

FOREIGN PATENT DOCUMENTS

| | | |
|---|---|---|
| JP | 2002-082955 | 3/2002 |
| JP | 2002-203109 | 7/2002 |
| JP | 2002342170 | 11/2002 |
| JP | 2002-366730 | 12/2002 |
| JP | 2003-150725 | 5/2003 |

* cited by examiner

[Figure 1]
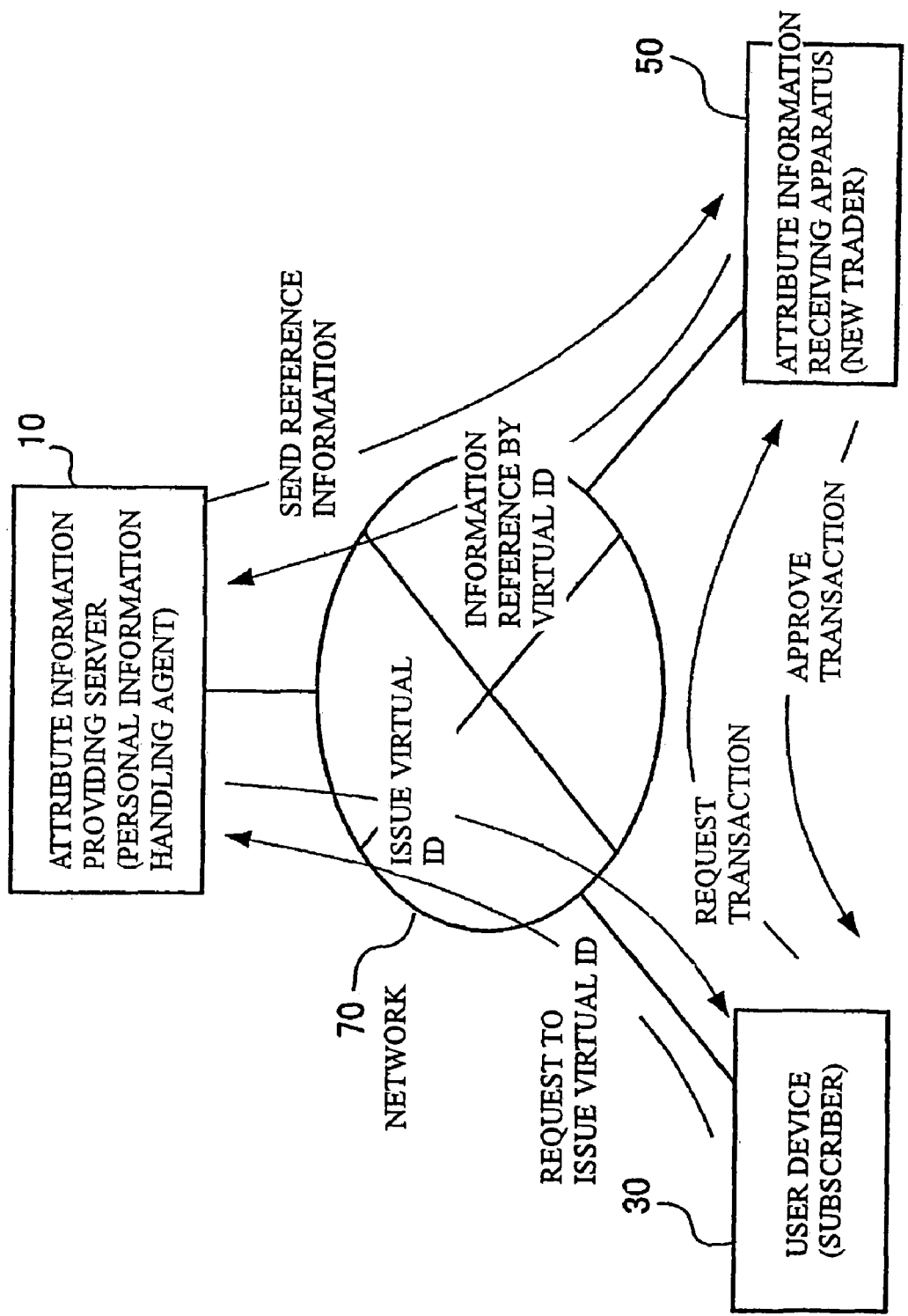

[Figure 2]
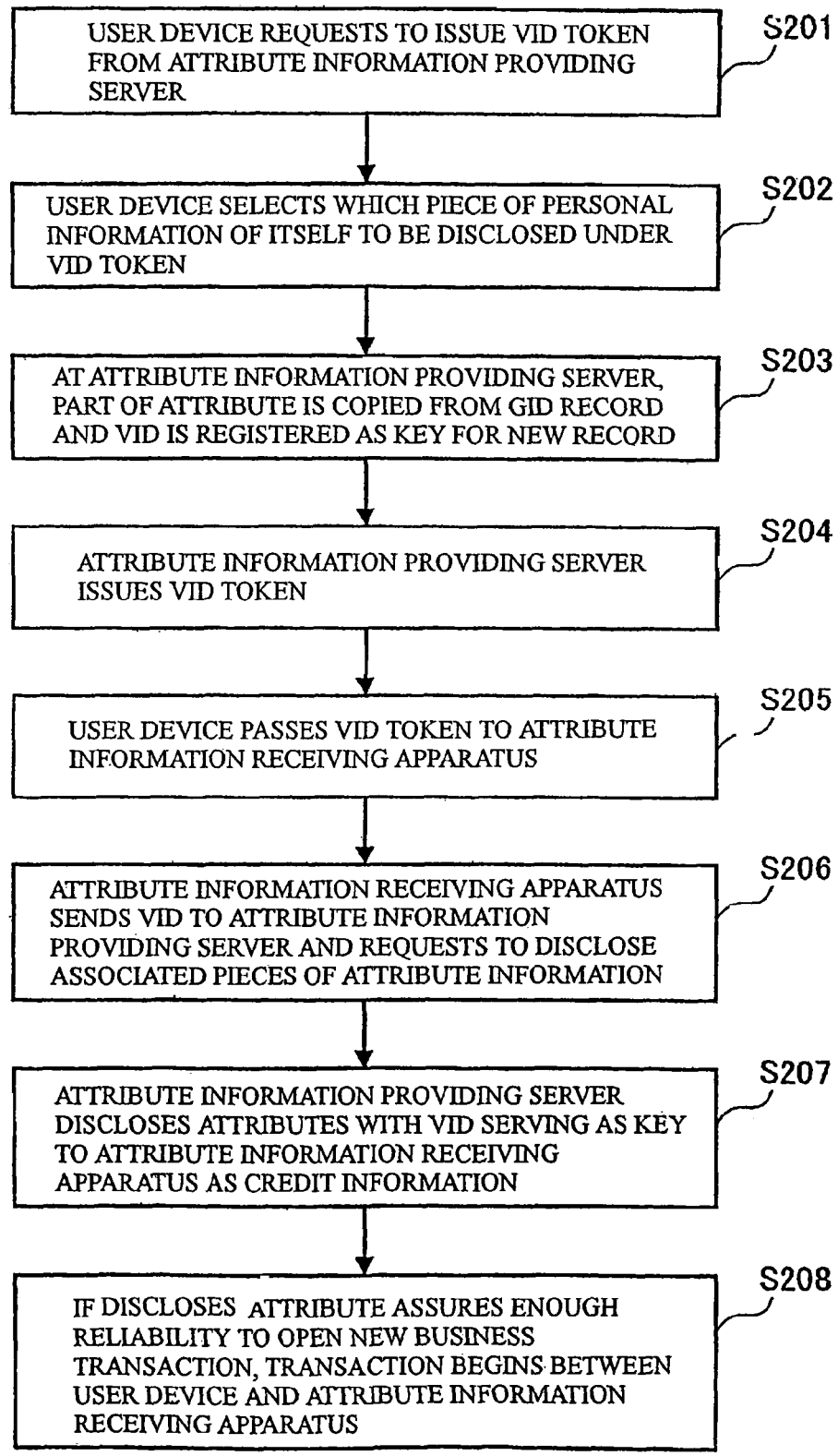

[Figure 3]
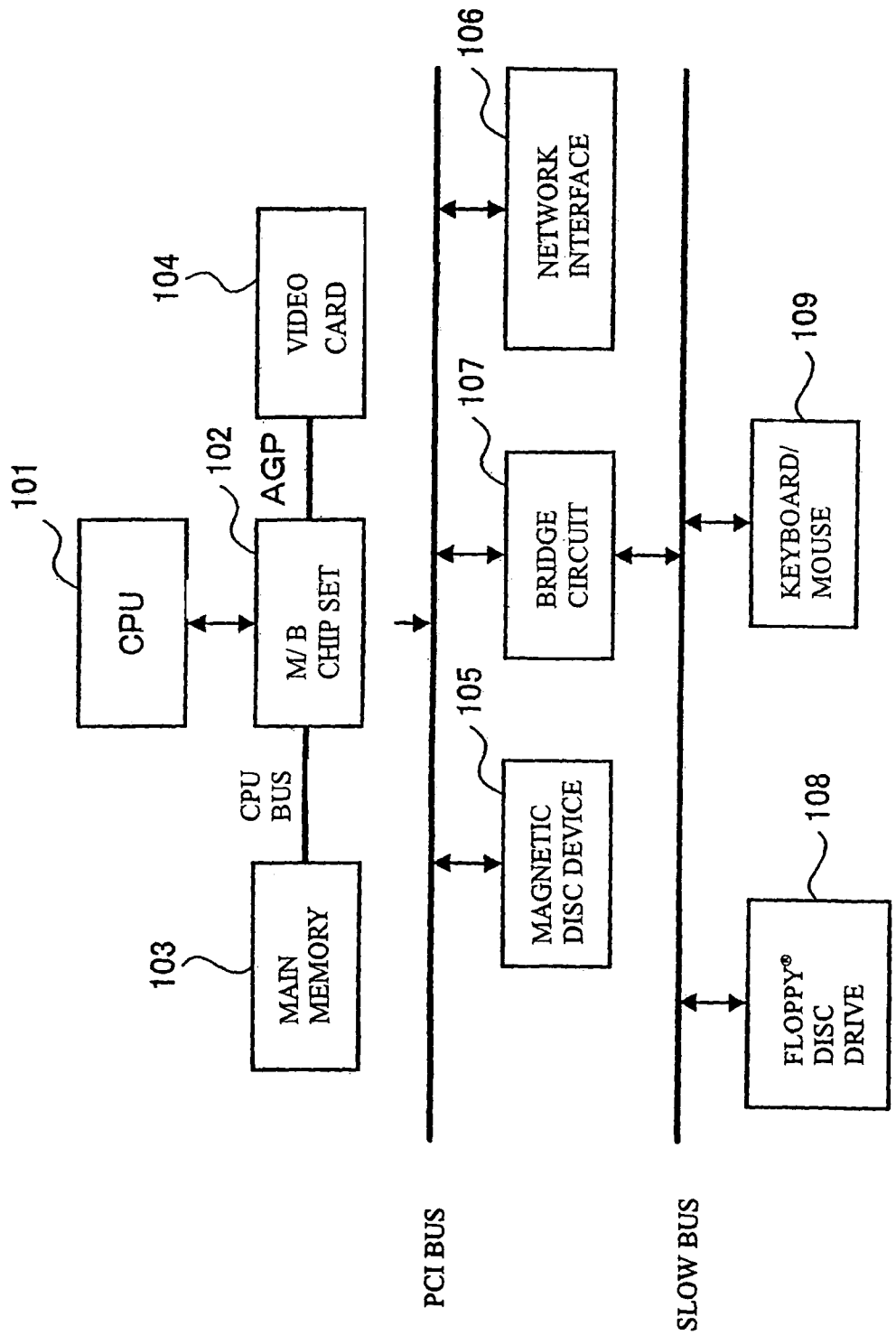

[Figure 4]
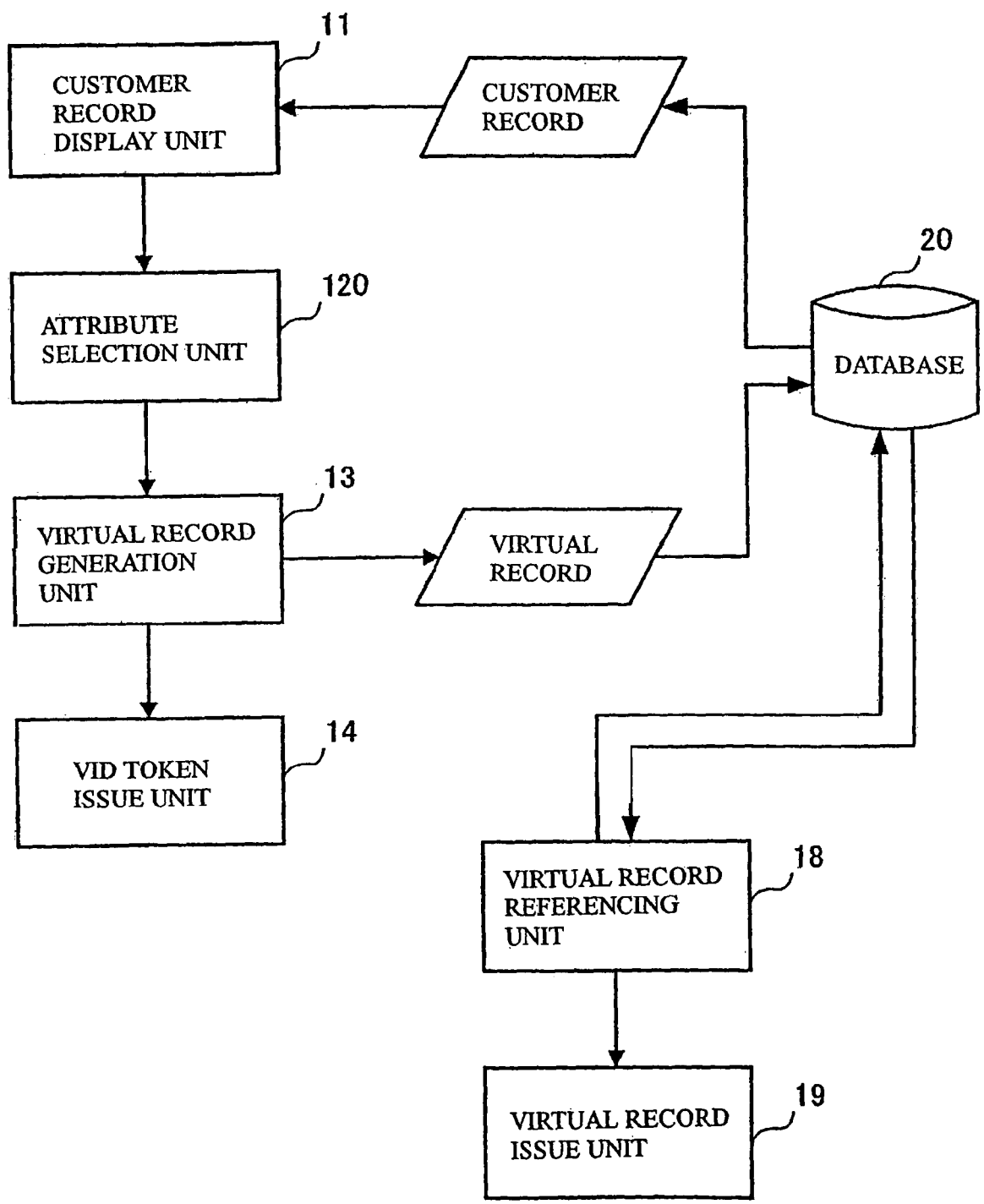

[Figure 5]

| GID/VID | NAME | ACCOUNT NUMBER | STREET ADDRESS | TELEPHONE NUMBER | DEPOSIT BALANCE | ... |
|---|---|---|---|---|---|---|
| G000011 | Ichiro Suzuki | 123456 | Tokyo | 333-4444 | 1,000,000 | |
| V010101 | Ichiro Suzuki | - | - | - | 1,000,000 | |
| V010011 | - | - | Tokyo | - | 1,000,000 | |

…

ATTRIBUTE INFORMATION PROVIDING METHOD

TECHNICAL FIELD

The present invention relates to an attribute information providing server and the like for providing attribute information via a network.

BACKGROUND ART

An Attribute Certificate is for certifying what kind of attribute a person has as a user authority, in contrast to a usual private key certificate, which is for certifying identification of a person. The specification of an Attribute Certificate is defined in X.509 stipulated by IETF (Internet Engineering Task Force) (for example, see Non-Patent Document 1). An Attribute Certificate is issued not by the Certification Authority, which issues a private key certificate, but by the Attribute Authority. The standard of OASIS (Organization for the Advancement of Structured Information Standards), SAML (Security Assertion Markup Language) has also been separating the certificate of identification and the certificate of attribute. This enables flexible certification and authorization to be given across domains of independent authorities. This also led a proposal of a new certificate service called the Federated ID (for example, see Non-Patent Document 2).

This attribute information (attribute data) includes name, street address, age, occupation, telephone number, sex, family structure and the like, varying from what relating to the position in the organization certified by the personal department of a company to individual interests or the like. The abovementioned attribute certificate is only available where the attribute can be certified by a public third party. A third party authority is not suitable as an authority for a personal attribute such as individual interests in terms of privacy protection. As such, the attribute is divided into the Authorized attribute certified by a third party and the Discretionary attribute defined totally by individual discretion, both of which have different security requirements.

A conventional art is for enabling additional information to be disclosed concurrently when a payment is made by credit at a store by storing attribute information including street address and the like as well as the card number in the IC-chip credit card in order to treat attribute data as credit information (for example, see Patent-Document 1). The Patent-Document 1 also describes a function of controlling information to be disclosed according to a disclosure level of the information by classifying the additional information. The Patent-Document 1 also describes a function of having a credit center run by a credit company or the like to rank the credit level of each franchisee and deciding information disclosure level according the rank.

A technique has been disclosed for simplifying input operation of personal information needed for a person to purchase a product or receive a service via a network, by making an authorizing server to issue a universal ID, which is a common ID, to a new registrant, retrieve necessary information for the business transaction including street address and the like from the registrant's personal information and send the information to another terminal in response to a requirement made when this universal ID is presented, in an authorizing system for a communication via a network (for example, see Patent-Document 2).

[Non-Patent Document 1]: FC 3281 on An Internet Athibute Certificate [searched on Aug. 4, 2003] Internet

[Non-Patent Document 2]: Liberty Alliance [searched on Aug. 4, 2003] Internet

[Patent Document 1]: Japanese Patent Publication No. 2001-325526 (pp. 4-5, FIG. 1)

[Patent Document 2]: Japanese Patent Publication No. 2001-244927 (pp. 3-4, FIG. 1)

If the information shared by a person and a service provider, which services the person, including a bank account, a purchase history and membership information among the abovementioned Authorized attribute is also treated as the person's attributes, it would be convenient in many respects. In the United States, examination performed for authorizing a card is quite strict, requiring a transaction history to prove that the applicant has maintained a bank account for more than a year, for example. If the bank certifies such a fact for such an occasion, a new business transaction can be opened more easily, which can be a favorable service for both an applicant and a service provider. Such shared information basically should be protected as personal information, however, a system of personal attribute credit service, which enables such information to be certified by a service provider protecting the information in response to the person's assent and need, is desired.

Credit card business is a typical business for servicing credit. With this business, in which the object of the credit is the money up to the credit amount, a card member of a credit card company receives settlement service for a commodity purchased at the company's affiliated store. On a network such as the Internet, however, parties who know nothing about each other want to open a business transaction with each other. Features of the credit over a network include:

1. that the object of credit must be confidence information other than money, and 2. that the parties want to open a business transaction with each other need not belong to the same confidence authority. Therefore, a membership of a reliable organization, the period of the membership, and the history of the person's activity during the period play an important roll as credit other than money, which cannot be realized in a credit card system. All of them are information shared by the person and the organization, to which the person belongs. In order to develop a confidence, the two parties that want to open business with each other need not belong to the same organization. A system for enabling a party to determine confidence of the counterpart in view of the party's criterion is needed. In the credit card system of these days, where accountability, a credit limit and a transaction object are predetermined, a system for providing such flexible credit, which is desired on the network, has not been realized yet.

In the technique described in the abovementioned Patent Document 1, the participants are limited to those within the conventional credit card scheme and the attributes of the participants are limited to information needed by a store to deliver a commodity. Techniques for certifying an attribute like the abovementioned X.509 do not cover a specific service system, such that the technique described in Non-Patent Document 1, for example, only defines a format of an attribute certification. In the technique described in the abovementioned Patent-Document 2, a subscriber cannot control such things as anonymity of the subscriber or what kind of attribute is to be certified. The subscriber does not get sufficient protection of the privacy, as a personal information handling agent always recognizes the new trader, with whom the subscriber wants to carry on a business transaction.

The present invention is adapted to solve the abovementioned technical problems. The object of the present invention is to realize an attribute information providing service for enabling an attribute other than money, for example, to be an object of credit by using a network such as the Internet.

Another object of the present invention is to provide a part of subscriber's personal information to the new trader with the approval of the subscriber.

Yet another object of the present invention is to enable authorization without letting a personal information handling agent to know the new trader, with whom the subscriber wants to carry on a business transaction.

DISCLOSURE OF THE INVENTION

With the objects, the present invention is an attribute information providing server for providing a one or more attributes from an attribute information database via a network, comprising: means for receiving an indication to extract one or more attributes from attributes stored in the database, from a user device via the network; means for registering, in the database, a virtual record which includes the one or more attributes extracted from the database in response to the indication from the user device; means for providing a virtual ID as a key of the virtual record to the user device; means for receiving a request with the virtual ID to read the virtual record, from an attribute information receiving apparatus via the network; and means for providing the virtual record to the attribute information receiving apparatus.

The means for receiving an indication can be characterized by enabling only the user device to reference attributes of an operator of the user device, and can be characterized by allowing the user device to copy an arbitrary attribute, and disables the user device to tamper an arbitrary attribute in case the means for receiving an indication enables the user device to extract the virtual record. With this feature, the attribute information providing server can provide a credit system with only responsibility of assuring that a part of personal information obtained from the user device such as a history of activity has not been tampered when the server discloses the part of information to the attribute information receiving apparatus with the approval of the user device, which is a subscriber. The means for receiving a request can be characterized by not knowing which virtual ID of the database is requested to read.

An attribute information providing server applying the present invention generates a virtual record which includes one or more attributes selected from attributes stored in a database by generation means and stores the virtual record in association with a virtual ID for identifying the virtual record, in the database by storage means. The attribute information providing server provides the virtual ID to a user device via a network by virtual ID providing means, and virtual record providing means provides the virtual record to the attribute information receiving apparatus, based on a request with the virtual ID from an attribute information receiving apparatus via the network. The virtual record providing means can be characterized by providing the virtual record to the attribute information receiving apparatus, in a state where the virtual record providing means can not know which virtual ID has been requested from the database.

The generation means can be characterized by generating a virtual record by extracting, by the user device, one or more attributes from the subscriber's attributes stored in the database. The virtual record providing means can be characterized by providing the virtual record to the attribute information receiving apparatus by using a 1-out-of-N OT (Oblivious Transfer).

From another viewpoint, an attribute information providing server applying the present invention comprises: a database for storing a customer record including one or more of attributes of each customer; a customer record display unit for, based on a request from a user device operated by the customer, reading the customer record of the customer from the database and providing it to the user device via a network; an attribute selection unit for receiving a selection of one or more attributes from the customer record, from the user device via the network; a virtual record generation unit for, based on the selection received from the attribute selection unit, generating a virtual record which includes the one or more attributes selected from the customer record to store the generated virtual record in the database; a virtual ID providing unit for providing a virtual ID for identifying the virtual record generated by the virtual record generation unit, to the user device; and a virtual record referencing unit for, based on a request with the virtual ID from the attribute information receiving apparatus via a network, obtaining a corresponding virtual record from the database to provide the virtual record to the attribute information receiving apparatus.

The virtual record generation unit is characterized by comparing the attribute of the original customer record and the attribute of the generated virtual record for checking whether the attribute has not been tampered. The virtual ID provided by the virtual ID providing unit to the user device can be characterized in that it is an unlinkable to an ID of the customer record.

An attribute information providing server applying the present invention stores a record including a plurality of attributes by record storage means and stores a virtual record generated with one or more attributes selected via a network from the record stored in the record storage means by virtual record storage means. The attribute information providing server discloses the virtual record selected from the virtual record storage means, via the network, in a state where the virtual record disclosure means can not know which virtual record has been selected by virtual record disclosure means.

The virtual record storage means is characterized by storing a virtual record in association with a virtual ID as a key and the virtual record disclosure means is characterized by receiving a request with the virtual ID in a state where the virtual record disclosure means cannot know which virtual ID has been selected. More specifically, the virtual record disclosure means realizes disclosure of the virtual record by using the encrypting technique of Oblivious Transfer.

When the present invention is considered from another category of the method, an attribute information providing method applying the present invention comprises the steps of: based on a request sent from a user device via a network, reading a record from a database storing records each of which includes a plurality of attributes; providing the record to the user device via the network; receiving a selection of one or more attributes from the record, from the user device via the network; generating a virtual record including one or more attributes selected from the record; storing the generated virtual record in the database; verifying that the one or more attributes included in the virtual record stored in the database has not been tampered attributes of the customer record; providing a virtual ID for identifying the stored virtual record, to the user device via the network; receiving a request with the virtual ID from the attribute information receiving apparatus via a network; reading a virtual record from the database based on the request; and providing the virtual record to the attribute information receiving apparatus via the network. The request for referencing information can be characterized by executed by using a 1-out-of-N OT (Oblivious Transfer).

From yet another viewpoint, an attribute information providing method applying the present invention is characterized by comprising the steps of: receiving a request with said virtual ID to acquire a virtual record stored in a database, said virtual record being generated by selecting one or more attributes from a customer record for each customer, and is associated with a virtual ID; and reading the virtual record associated with the virtual ID from the database to disclose the virtual record in response to the request to acquire, wherein during the step of receiving the request to acquire the virtual record, which virtual ID has been selected is concealed when the request to acquire is received. The attribute information providing method can further comprise the steps of: receiving a selection of the one or more attributes from the customer record of the customer via a computer device of the customer; generating the virtual record having only the selected one or more attributes to store the virtual record in the database; and providing the virtual ID for the virtual record stored in the database to the computer device.

The present invention can be considered as a program adapted to cause a computer functioning as an attribute information providing server for providing attribute information via a network to realize each of the functions. The program can be provided to a computer by a storage medium storing the program to be executed by a computer in a computer readable state as well as in a state of being installed in a computer serving as a server. The storage medium may include a DVD or a CD-ROM medium. The program is read by the DVD or the CD-ROM reading device and stored in flush ROM or the like and executed therein. The programs may be provided via a network by a program transmission device.

Specifically, the program applying the present invention causes a computer to realize functions of: based on a request via the network from a user device, reading a record from a database storing records each of which includes a plurality of attributes; providing the read record to the user device via the network; receiving a selection of one or more attributes selected from the record, from the user device via the network; generating a virtual record including the one or more attributes selected from the record; verifying that the one or more included in attributes the virtual record stored in the database has not been tampered from the attributes included in the record; storing the virtual record in the database; and providing a virtual ID for identifying the stored virtual record, to the user device via the network.

From another viewpoint, a program applying the present invention causes a computer functioning as an attribute information providing server for providing attribute information via a network, to realize functions of: storing a virtual record generated by selecting one or more attributes from a record, and associated with a virtual ID serving as a key, in a database; receiving a request with the virtual ID to acquire the virtual record, in a state where which virtual ID has been selected is concealed; and reading the virtual record associated with the virtual ID from the database, and disclosing the virtual record in response to the request to acquire.

According to the present invention, a profitable business dealing with attribute information can be provided for a particular individual or an authority, for example, by an authority having the attribute information to provide a part of the attribute information of the particular individual or the authority, for example, to the third party.

BRIEF DESCRIPTION OF THE DRAWINGS

FIG. 1 is a diagram showing an entire configuration of an attribute information providing system applying the embodiment (credit providing system);

FIG. 2 is a flowchart showing process executed by each device of the attribute information providing system;

FIG. 3 is a diagram schematically showing a hardware configuration of a computer device preferable to realize the attribute information providing server, the user device and the attribute information receiving apparatus of the embodiment;

FIG. 4 is a diagram showing a functional configuration in the attribute information providing server of the embodiment; and FIG. 5 is a diagram showing a customer record and a virtual record shown on the display of the user device.

DESCRIPTION OF SYMBOLS

10 . . . Attribute information providing server (personal information server)
11 . . . Customer record display unit
12 . . . attribute selection unit
13 . . . Virtual record generation unit
14 . . . VID token issue unit
18 . . . Virtual record referencing unit
19 . . . Virtual record issue unit
20 . . . Database
30 . . . User device
50 . . . Attribute information receiving apparatus (credit information receiving apparatus)
70 . . . Network

BEST MODE FOR CARRYING OUT THE INVENTION

An embodiment of the present invention will be described in detail with reference to the attached drawings.

FIG. 1 is a diagram showing an entire configuration of an attribute information providing system applying the embodiment (credit providing system). An attribute information providing server (personal information server) 10 set at a personal information handling agent, a user device 30 used by a subscriber of the attribute information providing system as a client terminal, and an attribute information receiving apparatus, which is a client terminal used by a new trader (credit information receiving device) 50 are arranged in the attribute information providing system with connected each other via a network 70 such as the Internet. The network 70 may be a public, wide-area network such as the Internet or a local network. In other words, the system of the embodiment can be configured by making a public database server provided on the Internet as the attribute information providing server 10 or can be configured in a closed style like an intranet in-company.

The attribute information providing server 10, which is a server administered by a service provider, manages personal information of members (of the user devices 30) or information on transaction with members, and issues a virtual ID token (VID token) for authenticating an attribute with the approval of the member. The virtual ID token is formed by including the URL of the attribute information providing server 10 with a virtual ID (VID). In the user device 30, which is a member of the service provider and a client for requesting the virtual ID to be issued, an attribute desired to be disclosed to the attribute information receiving apparatus 50, which is a new trader, is selected from the personal information (a customer record, sometimes simply referred to as "record") registered in the attribute information providing server 10 and the attribute information providing server 10 is requested to issue a VID token. The attribute information receiving apparatus 50, which is an arbitrary counterpart as an attribute receiver, receives an attribute certificate for establishing trust-relationship via the attribute information providing server 10 when a new transaction is carried out with the user device 30.

At the attribute information providing server 10, the VID token is issued to the user device 30, which is a subscriber, and a virtual record is referenced in the attribute information receiving apparatus 50, which is a new trader. For the reference, what is referenced with the VID token being concealed is referred to as VID concealed reference. Functions of the attribute information providing server 10 will be described in detail later.

At the user device 30, the VID token is acquired from the attribute information providing server 10 and a VID token is sent to the VID token to the attribute information receiving apparatus 50 for passing thereto.

When the VID token is acquired, the user device 30 communicates with the attribute information providing server 10 by using a Web browser. In this communication, the user device 30 can prevent the information from being intercepted by a third party by using an encryption such as the SSL (Secure Sockets Layer) or an authorizing function. The user device 30 can also be authorized with the Basic authentication defined by the general HTTP (Hypertext Transfer Protocol).

The user device 30 sends the acquired VID token to the attribute information receiving apparatus 50 by using a mail protocol such as the SMTP (Simple Mail Transfer Protocol) for sending a VID token.

At the attribute information receiving apparatus 50, the VID token is acquired from the user device 30 and a virtual record is acquired from the attribute information providing server 10.

In acquiring of the VID token, a VID token is acquired from the user device 30 by general mailing software.

The virtual record can be acquired in a general acquirement or in a VID concealed acquirement. In the general acquirement, the attribute information receiving apparatus 50 connects to the attribute information providing server 10 by using the URL included in the VID token, presents the VID, and acquires the virtual record. In the VID concealed acquirement, the attribute information receiving apparatus 50 and the attribute information providing server 10 use the OT protocol (described later) to obtain an attribute.

The embodiment uses two encryption techniques shown below as element techniques.

First, the first encryption technique is the OT (Oblivious Transfer) 1-out-of-N OT is a protocol between a server having N pieces of information and a client that wants to read one of the pieces (between the two parties), where the client can read only a piece of information of the N pieces and the server cannot recognize which piece the client read. In other words, a client (for example, the attribute information receiving apparatus 50) can receive a piece of the N pieces of information possessed by the attribute information providing server 10, which is an information provider, and the attribute information providing server 10 cannot recognize which one is selected. Document [Naor, M. and Pinkas, B.: Oblivious Transfer and Polynomial Evaluation, in proc. of STOC, 1999.] describes the technique in further detail, thus the description of the technique will be omitted here.

The second encryption technique is homomorphism of an encrypting function. A public key encrypting function with homomorphism, Epk(X) satisfies $$Epk1(Epk2(X))=Epk2(Epk1(X))$$

For example, the ElGamal encryption to be described later has homomorphism.

Each protocol executed in the attribute information providing system shown in FIG. 1 will be described.

FIG. 2 is a flowchart showing process executed by each device of the attribute information providing system. The flowchart will be described with reference to the entire configuration shown in FIG. 1. First, the user device 30 requests to issue a virtual ID token (VID token) including a virtual ID (VID: Virtual ID) from the attribute information providing server 10 via a network 70 (step 201). The user device 30 selects which piece of personal information (customer record) on the user device 30 is to be disclosed under the VID token (step 202). At the attribute information providing server 10, a part of an attribute is copied from a GID (Globally-unique ID) record (to be described later) and a new record is registered in a database (to be described later) with the virtual ID as a key (step 203). Then, the attribute information providing server 10 issues the VID token to the user device 30 via the network 70 (step 204).

Next, the user device 30 passes the VID token to the attribute information receiving apparatus 50 and a transaction request including the virtual ID is outputted via the network 70 (step 205). Then, the attribute information receiving apparatus 50 presents the acquired virtual ID to the attribute information providing server 10 and requests to disclose the associated pieces of attribute information (step 206). The attribute information providing server 10 discloses the attributes with the virtual ID serving as a key, i.e., reference information of the virtual ID (virtual record) to the attribute information receiving apparatus 50 as credit information (step 207). If the attribute information receiving apparatus 50, which acquired the virtual record in this manner, is assured that it is reliable enough to open a new business transaction according to the disclosed attributes (the results of the virtual record), the attribute information receiving apparatus 50 informs the user device 30 via the network 70 that it accepts the transaction and the transaction between the user device 30 and the attribute information receiving apparatus 50 is started (step 208).

Now, the hardware configuration of each component applying the embodiment will be described.

FIG. 3 is a diagram schematically showing a hardware configuration of a computer device preferable to realize the attribute information providing server 10, the user device 30 and the attribute information receiving apparatus 50 of the embodiment.

The computer device shown in FIG. 3 includes a CPU (Central Processing Unit) 101 serving as calculation means, M/B (motherboard) chip set 102, main memory 103 connected to the CPU 101 via the M/B chip set 102 and a CPU bus, and a video card 104 also connected to the CPU 101 via the M/B chip set 102 and an AGP (Accelerated Graphics Port). The computer device also has a magnetic disc device (HDD) 105 and a network interface 106 connected to the M/B chip set 102 via a PCI (Peripheral Component Interconnect) bus. The computer device further includes a floppy disc drive 108 and a keyboard/mouse 109 connected to the M/B chip set 102 via a bridge circuit 107 from the PCI bus and a slow bus such as the ISA (Industry Standard Architecture) bus.

FIG. 3 merely exemplifies a hardware configuration of a computer device for realizing the embodiment and the other various configurations can be employed if only they can apply the embodiment. For example, the computer device may be adapted to only include video memory instead of including the video card 104 and have the CPU 101 process image data. The computer device can also be provided with a drive for CD-R (Compact Disc Recordable) or DVD-RAM (Digital Versatile Disc Random Access Memory) as external memory via an interface such as the ATA (AT Attachment) or the SCSI (Small Computer System Interface).

Now, a functional configuration in the attribute information providing server 10 of the embodiment will be described with reference to FIG. 4.

As shown in FIG. 4, the attribute information providing server 10 includes a customer record display unit 11 and an attribute selection unit 12 functioning as means for receiving an extraction command, a virtual record generation unit 13 functioning as one of virtual record generation means, and a VID token issue unit 14 functioning as one of virtual ID providing means, as functions of issuing a VID. The attribute information providing server 10 also includes a virtual record referencing unit 18 and a virtual record issue unit 19 as a function of referencing a virtual record (virtual record providing means). The attribute information providing server 10 further includes a database 20 for storing a customer record or a virtual record of the user device 30, which is a subscriber, by using the magnetic disc device 105 shown in FIG. 3, for example.

The database 20 manages personal information by the table shown in FIG. 5. The original personal information record is saved by using a customer record consisting of plural attributes as a GI (Globally-unique ID) key for each customer. A part of the attribute is copied from here and recorded with a virtual ID as a key. As shown in FIG. 5, even the pieces of information on the same person, different parts of the GID attribute is copied for each of the virtual IDs and the different pieces of attribute information is selected for each of the virtual IDs "V010101" and "V010011". An unwanted attribute is filtered out in the attribute authentication for the virtual ID attribute. As in the virtual ID "V010011" shown in FIG. 5, for example, the name part can be filtered out as an anonymous attribute. A virtual ID is considered as an ID unlinkable to GID when the virtual ID is issued. Only a necessary attribute is copied from GID attribute, which is a real ID, when an attribute is copied. A virtual ID field can be dealt as totally the same as the real ID and is configured as undistinguishable from the real ID record, which loses some attributes.

When the virtual ID is issued, the customer record display unit 11 retrieves a customer record of the user device 30, which is a subscriber, from the database 20 and displays the retrieved contents on a display (not shown) of the user device 30, for example, for reference. The customer record displayed here is a record with a GID as a primary key and consisting of plural attributes including name, street address and the like as shown in FIG. 5. The customer record display unit 11 can display a virtual record, which has been generated by selecting an attribute, as well as a GID for reference, as shown in FIG. 5.

The attribute selection unit 12 causes the user device 30, which is a subscriber, to extract (select) only the attribute the user device 30 wants to present to the attribute information receiving apparatus 50, which is a new trader, from the displayed attribute.

The virtual record generation unit 13 creates a new record, which is a copy of only extracted attributes at the user device 30. The virtual record generation unit 13 generates an ID as a primary key of the record different from the GID, which is a primary key of an existing key, as a virtual ID. It is assumed that a domain with virtual ID values defined is large enough and anyone who does not know the virtual ID has no chance of finding a virtual ID by Brute Force Attack, for example. The generated virtual record is stored in the database 20.

At the VID token issue unit 14, a set of a virtual ID generated by the virtual record generation unit 13 and a URL of the server (the attribute information providing server 10) {VID, URL} is issued as a VID token.

At the virtual record referencing unit 18, process of usual reference or process of VID concealed reference is performed to reference the virtual record. The attribute information receiving apparatus 50 that received a VID token from the user device 30 is connected with the attribute information providing server 10 by accessing the URL included in the VID token by using a browser, for example, as mentioned above. The virtual record referencing unit 18 searches database 20 for a virtual record based on the virtual ID presented by the attribute information receiving apparatus 50 and causes the virtual record issue part 19 to display the search result on a display (not shown) of the attribute information receiving apparatus 50. The attribute information receiving apparatus 50 can acquire attribute information in the virtual record on the display. A service for certifying that the attribute information is in the attribute information providing server 10 can be made available if a signature of the attribute information providing server 10 is added to the attribute i at the virtual record referencing unit 18 or the virtual record issue unit 19.

Now, the virtual ID concealed reference performed at the attribute information providing server 10 will be described.

The concealed reference is for acquiring a virtual record, while the virtual ID is kept secret from the attribute information providing server 10. The abovementioned OT (Oblivious Transfer) is used for the concealed reference. A simple OT:

OT($\{s_1, \ldots, s_n\}$) will be described below.

First, the attribute information providing server 10 randomly decides a secret value of $Z_q \exists t_s$ in advance and releases $Q_0 = g^{ts} \mod p.$ The attribute information receiving apparatus 50 randomly selects a secret key $t\_u$ from $Z\_q$ and calculates the public key for it $Q_u = g^{tu} \mod p.$ The attribute information receiving apparatus 50 is assumed to be trying to acquire the $h^{th}$ piece of information of the attribute information providing server 10. First, the attribute information receiving apparatus 50 uniquely decides a linear polynomial Y(x) for passing two points $\{(0, Q_0), (h, Q_u)\}$ by using the Lagrangean interpolation, for example. With this polynomial, the attribute information receiving apparatus 50 calculates n point $Y_i = Y(i)$, i=0, . . . , n−1 and sends $\{Y_1, Y_2, \ldots, Y_n\}$ to the attribute information providing server 10.

The attribute information providing server 10 verifies that the point released by the attribute information receiving apparatus 50 is a point on a linear polynomial, then sends $E_{y_i}(s_i, Y_i)$, i=1, . . . , n$, which is secret information $s_i$ encrypted, to the attribute information receiving apparatus 50 with $Y_i$ being a public key of the ElGamal encryption, respectively.

As the attribute information receiving apparatus 50 has a secret key $t_u$ corresponding to the point designated by h, it can decrypt the ElGamal encrypted text returned from the attribute information providing server 10. In this manner, the attribute information receiving apparatus 50 can acquire a piece of secret information.

For the OT, the $h^{th}$ must be designated. Where the virtual ID (VID) possessed by the attribute information receiving apparatus 50 places in the entire customer record can be set in the manner below. For example, the attribute information providing server 10 enables the setting by releasing a list of H (VID) by using an unidirectional hash function H( ). It is assumed that an algorithm of the hash function H is released. The attribute information receiving apparatus 50, which is a new trader, for example, can recognize the placement of its virtual ID in the list of H (VID).

In this manner, the H(VID)$^{th}$ record can be acquired by the abovementioned OT protocol. The attribute information receiving apparatus 50 may designate a record of other than H(VID)$^{th}$ corresponding to its virtual ID in this case. In order to prevent such designation, the attribute information providing server 10 encrypts the attribute of the virtual record by using H'(VID) as a key with another hash function H'( ) in advance. It is assumed that the algorithm of the hash function H' is also released. Then the receiving apparatus that has VID can decrypt the attributes in the H(VID)$^{th}$ record. The abovementioned description can be comprehended as below.

A virtual record is assumed to consist of m attributes as below.

$$\{VID_i, Attr_{\{i, 1\}}, \ldots, Attr_{\{i, m\}}\}$$

The attribute is encrypted to below, where $k_i$=H'(VID$_i$):

$$s_i = \{H(VID_i), E_{ki}(Attr_{\{i, 1\}}), \ldots, E_{ki}(Attr_{\{i, m\}})\}$$

Then, the entire virtual record is sorted by using H(VID$_i$) as a key, ordered, and subjected to OT($\{s_1, \ldots, s_n\}$).

In the attribute information receiving apparatus 50, a virtual record $$s\_i = \{H(VID_i), E_{ki}(Attr_{\{i, 1\}}), \ldots, E_{ki}(Attr_{\{i, m\}})\}$$

can be acquired based on the virtual ID acquired from the user device 30, for example. The attribute information receiving apparatus 50 decrypts this with $k_i$=H'(VID$_i$) and acquires m attributes.

As detailed above, in the embodiment, the user device 30, which is a subscriber, is adapted to use a browser to enter the attribute information providing server 10 operated by a persona information handling agent via the network 70. The user device 30 is further adapted to register necessary information extracted from a personal attribute table stored in the database 20 on the attribute information providing server 10 as a virtual record to have a virtual ID issued for a key of this virtual record. Then, the user device 30 sends the virtual ID and information necessary for authorization to the attribute information receiving apparatus 50, which is a new trader. The attribute information receiving apparatus 50 uses the virtual ID to log in the attribute information providing server 10. Then, the attribute information receiving apparatus 50 can start the transaction by acquiring information data registered in the virtual record from the attribute information providing server 10, referencing attribute data and determining whether the counterpart of the transaction is reliable or not.

Security requirement of this protocol are:

(1) The user device 30 can read only the attribute record of the user device 30 on the attribute information providing server 10.

(2) The user device 30 can copy any attribute in the original attribute record (GID record) but cannot tamper it when it register a virtual record.

(3) The attribute information receiving apparatus 50 can read only the virtual record of the virtual ID (+password) passed from the attribute information providing server 10 by using the virtual ID (+password). The privacy requirements bellow can also be added, if required.

(4) The attribute information providing server 10 cannot recognize which virtual ID the attribute information receiving apparatus 50 is trying to acquire, i.e., which user device 30's virtual record the attribute information receiving apparatus 50 is trying to pass when the attribute information receiving apparatus 50 tries to acquire the virtual record.

(1) and (3) of the above requirements are easily realized only with the conventional authentication system. (2) of the above requirements can be realized to check the server side when a virtual record is registered as below.

As mentioned above, a virtual record and a virtual ID are issued on the attribute information providing server 10 in the manner shown below in the embodiment:

(1) a personal information record is assumed to be registered in the database 20 with an ID of GID as a primary key;

(2) the user device 30, which is a subscriber, creates an empty record, whose key is a virtual ID (VID) irrelevant to GID;

(3) the user device 30, which is a subscriber, copies only a part of attribute the user device 30 wants to disclose to the counterpart of the transaction among its GID record to the virtual ID record; and (4) the attribute information providing server 10 calculates OR of the attribute part of the original record and the attribute part of the virtual record and verifies that the result is the same as the attribute part of the original record. That is to say, $$\text{Attribute(GID) OR Attribute(VID)=Attribute(GID)}$$

The requirement (4) is realized by the encryption technique OT.

With the abovementioned configuration, in the embodiment, an authority which has personal information (the attribute information providing server 10) provides a part of the personal information to a third party in response to the person's request. The authority which has personal information can make a business of providing such information. A subscriber (the user device 30) can easily acquire necessary credit on the Internet (the network 70). The authority which has personal information (the attribute information providing server 10) may include a financial institution, an ISP (Internet Service Provider) and a shopping site on a network. As such authorities issue personal information with the approval of the subscriber (the user device 30), no violation of privacy occurs. The new trader (the attribute information receiving apparatus 50) can determine whether or not to consider the passed information as sufficient credit information at the discretion of itself. The personal information handling agent (the attribute information providing server 10) has only the responsibility to limit that the information it discloses is the same as that it has (i.e., the information is not tampered) and needs not assure the correctness of the credit information. For example, the personal information handling agent does not assure the correctness of the information if the subscriber (the user device 30) registers false information for the subscriber's information.

According to the embodiment, the attribute record is shared (attribute registered by the subscriber and activity history information including bank account) by a subscriber (the user device 30) and a personal information handling agent (the attribute information providing server 10) and the subscriber (the user device 30) can read only the attribute record of the subscriber on the attribute information providing server 10. The subscriber (the user device 30) can copy any attribute in the original attribute record but cannot tamper any when it registers a virtual record. This enables the subscriber to authenticate only the attribute such as a bank account without being identified the name. In addition, the new trader (the attribute information receiving apparatus 50) can read only the virtual record by using the virtual ID (+password) passed from the subscriber (the user device 30). In other words, authentication is performed only with a virtual ID at the new trader's side (the attribute information receiving apparatus 50) and a personal information handling agent (the attribute information providing server 10) cannot recognize who accessed the virtual record. As a result, it is clarified that the subscriber (the user device 30) is responsible for the passage of the virtual ID. The personal information handling agent (the attribute information providing server 10) cannot recognize which subscriber's (the user device 30) virtual ID is requested by 1-out-of-NOT. This enables the subscriber (the user device 30) to receive authentication without letting the personal information handling agent (the attribute information providing server 10) know which new trader (the attribute information receiving apparatus 50) the subscriber is going to open business with. This enhances the protection of the privacy of the subscriber (the user device 30). This also enables the personal information handling agent (the attribute information providing server 10) to provide services without knowing unnecessary information.

INDUSTRIAL APPLICABILITY

Usage of the present invention includes a server used as an attribute information providing server and a computer such as a PC used as a user device or an attribute information receiving apparatus, with a system configuration of connecting them by Web via a network such as the Internet. An attribute information providing server applied as a service provider includes an ISP (Internet Service Provider), a financial institution and a shopping site. The higher the reliability of the service provider in the industry, the higher the value of the credit service is.

The invention claimed is:

1. A method for providing attribute data, said method comprising:
receiving a request from a user device via a network for a virtual ID token relating to attribute information pertaining to a subscriber associated with the user device;
responsive to the request for the virtual ID token, reading a data record from a database, said data record comprising L attributes of the subscriber, L being at least 2;
providing the data record to the user device via the network;
receiving, from the user device via the network, a selection of M attributes of the L attributes, M being less than L;
generating a virtual record including the M attributes selected from the data record, said virtual record comprising a virtual ID (VID) for identifying the virtual record;
storing the generated virtual record in the database; and
providing the virtual ID token to the user device via the network, wherein the virtual ID token comprises the VID, wherein an attribute information providing server performs said receiving the request for the virtual ID token, said reading the data record from the database, said providing the data record to the user device, said receiving the selection of M attributes, said generating the virtual record, said storing the generated virtual record in the database, and said providing the virtual ID token to the user device.

2. The method of claim 1, said method further comprising:
receiving a request comprising the VID for attribute information associated with the VID from an attribute information receiving apparatus via the network;
reading the virtual record from the database in response to the request comprising the VID; and
after said reading, providing the virtual record to the attribute information receiving apparatus via the network, wherein the attribute information providing server performs said receiving the request comprising the VID, said reading the virtual record from the database, and said providing the virtual record to the attribute information receiving apparatus.

3. The method of claim 2, wherein said providing the virtual record to the attribute information receiving apparatus is performed in manner that ensures that the virtual ID is concealed from the attribute information receiving apparatus when the virtual record is received by the attribute information receiving apparatus.

4. The method of claim 3, wherein said providing the virtual record to the attribute information receiving apparatus is performed using a 1-out-of-N OT (Oblivious Transfer) protocol.

5. The method of claim 2, said method further comprising after said providing the virtual record to the attribute information receiving apparatus:
providing, by the attribute information providing server, an attribute certificate to the attribute information receiving apparatus in relation to a new transaction between the subscriber and the attribute information receiving apparatus, wherein the attribute certificate pertains to the M attributes in the virtual record provided to the attribute information receiving apparatus.

6. The method of claim 2, wherein the attribute information providing server comprises:
a customer record display unit for displaying the virtual record;
an attribute selection unit for extracting the M attributes from the data record prior to said generating the virtual record;
a virtual record generation unit for performing said generating the virtual record;
a VID token issue unit for performing generating the virtual ID token prior to said providing the virtual token ID to the user device;
a virtual record referencing unit for referencing the virtual record based on the VID prior to said providing the virtual record to the attribute information receiving apparatus; and
a virtual record issue unit for performing said providing the virtual record to the attribute information receiving apparatus.

7. The method of claim 1, wherein the VID token further comprises a URL of the attribute information providing server.

8. The method of claim 1, wherein the attribute information providing server is selected from the group consisting of a financial institution, an Internet Service Provider (ISP), and a shopping site on the network.

9. The method of claim 1, further comprising:
receiving a selection of M1 attributes of the L attributes in the data record, wherein the M1 attributes are not identical to the M attributes; and
storing a second virtual record in the database, wherein the second virtual record comprises the M1 attributes, and wherein the attribute information providing server performs said receiving the selection of M1 attributes and said storing the second virtual record in the database.

10. The method of claim 1, wherein the data record comprises a globally-unique ID (GID) serving as a primary key of the data record, wherein the VID is a primary key of the virtual record, and wherein the VID is independent of the GID.

* * * * *